United States Patent Office 3,234,589
Patented Feb. 15, 1966

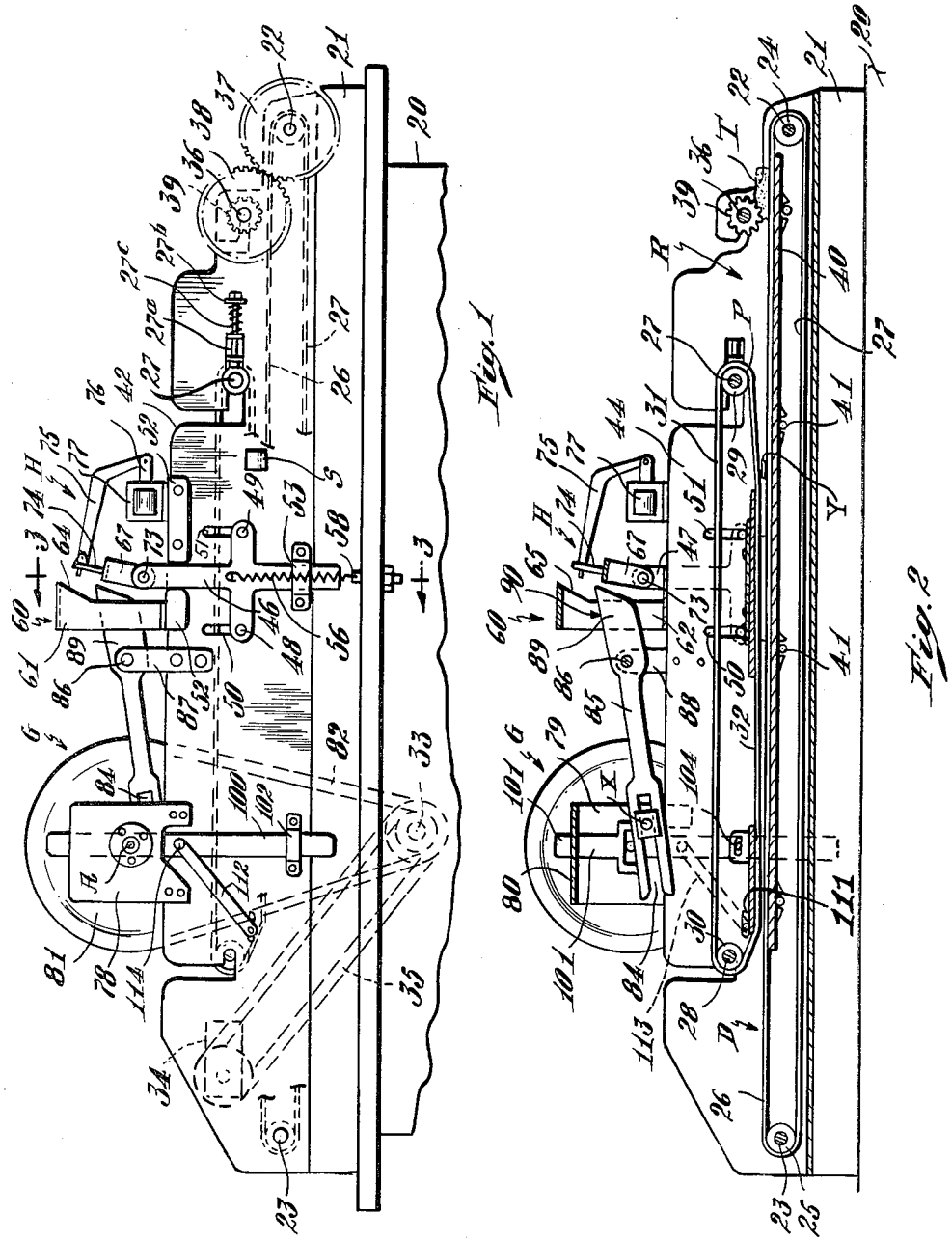

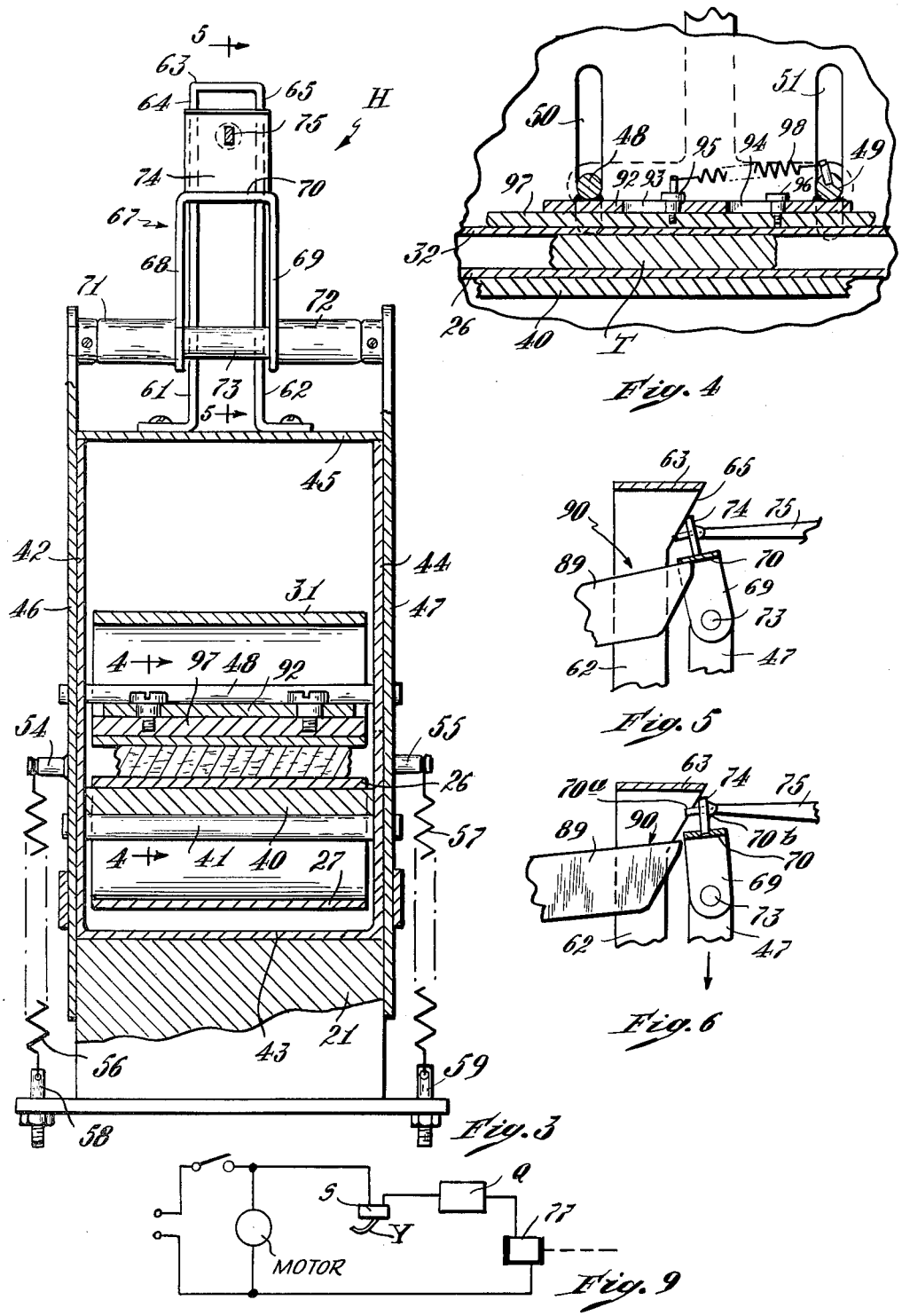

3,234,589
APPARATUS FOR PREPARING MEAT CUTLETS
Charles F. Haynes, South Portland, Maine, and Eugene E. Vance, Sr., Lawrence, Mass., assignors to Bea's Sandwich Shop, Inc., Lawrence, Mass., a corporation of Massachusetts
Filed Feb. 28, 1964, Ser. No. 348,106
19 Claims. (Cl. 17—25)

This invention pertains to apparatus for use in the preparation of meat cutlets, for instance pork or veal cutlets, and, in particular, for preparing cutlets of uniform size; wherein the fibers have been crushed but not cut; and which do not show appreciable shrinkage in cooking. Cutlets having the above characteristics are in demand by restaurants, but heretofore the preparation of such cutlets has involved the very laborious operation of pounding the cutlet upon a block with the flat side of a cleaver or equivalent instrument. This operation is so slow and tiring that it is difficult to obtain workers for performing it. Consequently, the cost of cutlets so prepared is substantial and in fact prohibitive as respects the requirements of many restaurants.

The object of the present invention is to provide power-driven apparatus capable of preparing cutlets, having the above characteristics, much more rapidly and at much lower cost than when the operation is performed manually. A further object is to provide mechanism for preparing cutlets such that the cutlets thereby produced are more uniform than is readily obtainable by the manual operation, and which are tenderer and less subject to shrinkage during cooking than those produced by previous methods.

Other and further objects and advantages of the invention will be pointed out in the following more detailed description and by reference to the accompanying drawings wherein:

FIG. 1 is a side elevation, with certain parts indicated by dotted lines, showing the complete apparatus (except for the drive motor) in accordance with the present invention;

FIG. 2 is a vertical, longitudinal midsection showing the apparatus of FIG. 1;

FIG. 3 is larger scale, vertical section, substantially on the line 3—3 of FIG. 1, showing the means for subjecting the cutlet to a fiber-crushing treatment in which it is also reduced in thickness;

FIG. 4 is a fragmentary section on the line 4—4 of FIG. 3;

FIG. 5 is a fragmentary section on the line 5—5 of FIG. 3, showing the fiber-crushing device as its hammer device is being moved upwardly to elevated position;

FIG. 6 is a view similar to FIG. 5, but showing the parts at the instant at which the fiber-crushing hammer device has been released to perform its intended function;

FIG. 9 is a circuit diagram showing the electrical connections employed in the device.

Figure 7:
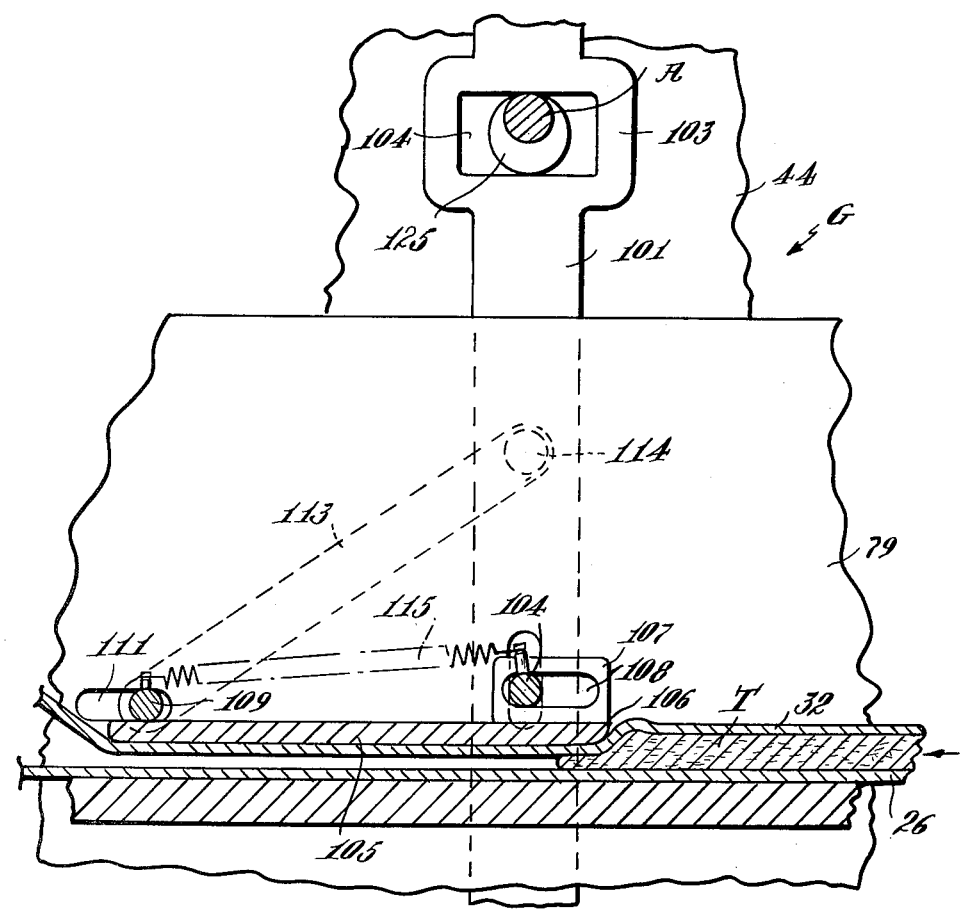
FIG. 7 is a fragmentary, longitudinal, vertical midsection, to larger scale than FIG. 1, showing the squeezing device for applying final flattening pressure to the cutlet thereby to reduce it to final thickness while, at the same time, stretching it horizontally, the squeezing element being shown in its lowermost or operating position.

Referring to the drawings, the numeral 20 (FIGS. 1 and 2) designates a support of any suitable type for the frame 21 of the apparatus herein disclosed. This frame comprises a base and parallel, upstanding side walls 42 and 44. These walls carry bearings for parallel, horizontal shafts 22 and 23 arranged, respectively, adjacent to the opposite ends of the frame and to which are fixed rolls 24 and 25 (FIG. 2) respectively, about which is entrained an endless lower belt having the upper horizontal run 26 and the lower horizontal run 27.

The walls 42 and 44 also carry bearings for parallel, horizontal shafts 27 and 28 (FIG. 2) upon which are mounted rolls 29 and 30 respectively, about which is entrained an endless upper belt having the upper horizontal run 31 and the lower run 32.

The bearings for the shaft 27 are horizontally movable, being connected to slidable rods 27a (FIG. 1) which are connected at their right-hand ends, as shown in FIG. 1, to a transversely extending rigid plate 27b which is urged toward the right, as viewed in FIG. 1, by coiled springs 27c. By this means the upper belt is tensioned, although, at the same time, permitting the lower run 32 of this belt to move up or down to a slight extent as cutlets, advancing between the belt runs 26 and 32, are subjected to treatment.

As shown in FIG. 2, the shafts 27 and 28 are spaced inwardly from the ends of the frame so that the lower belt is longer than the upper belt, thus leaving portions R and D (FIG. 2) of the upper run 26 of the lower belt exposed for the reception and delivery, respectively, of cutlets.

A suitable drive motor (not shown), having a shaft 33 (FIG. 1) drives the input shaft of a speed-reducer 34 of conventional type (indicated in broken lines), by means of a belt 35. The delivery shaft of this speed-reducer is connected to the shafts 28 and 23 by appropriate gearing (not shown), so as continuously to drive the belt runs 26 and 32 at the same speed and in the same direction, both belt runs moving from right to left as viewed in FIG. 2. Another horizontal shaft 36 (FIGS. 1 and 2), parallel to the shafts 22 and 27, is driven by intermeshing gears 37 and 38 (FIG. 1), the gear 37 being fixed to the shaft 22. On the shaft 36 there is fixed a roller 39 which may, for examle, be of hard wood and whose periphery is provided with longitudinally extending teeth which may be generally like gear teeth.

A rigid fixed-supporting plate 40 (FIG. 2) is arranged to provide support for the upper run 32 of the lower belt, this plate extending from a point near the shaft 24 to a point approximately in the vertical plane of the axis of the shaft 28, this plate 40 being supported in any suitable way by the machine frame, for example, by a plurality of spaced rigid rods 41 whose ends are fixed in holes in the opposite side walls of the machine frame.

The shaft 36 is arranged at a distance above the upper run 32 of the lower belt, less than the initial thickness of the cutlet to be treated, such that when a cutlet T (FIG. 2) is laid upon the exposed right-hand end portion of said upper run and pushed into engagement with the roll 39, the teeth of the latter grip the cutlet and, while compressing it, positively advance it toward the left in the direction of movement of the upper run of the lower belt. Desirably, the peripheral speed of the roll 39 is approximately the same as that of the upper run of the lower belt.

The fiber-crushing apparatus is generally indicated by the character H in FIGS. 1, 2 and 3, this apparatus, as here shown, being located approximately midway of the length of the lower belt. As above noted, the frame of the machine comprises transversely spaced, vertical side walls 42 and 44 (FIG. 3) which, as here shown, are integrally united to a transverse bottom member 43 which rests upon and is fixed to the base 21 of the frame. These walls 42 and 44, at the location of the apparatus H, are secured at their upper edges to a top plate 45. The crushing apparatus comprises two vertically movable plungers 46 and 47 respectively, (FIGS. 1, 2 and 3), disposed in sliding contact with the outer surfaces of the frame members 42 and 44, and which are united by parallel, transversely extending rods 48 and 49 (FIG. 4) which pass through elongate vertical slots 50 and 51 respectively (FIGS. 1, 2 and 4), in the front and rear walls of the frame. These plungers are additionally guided by the opposed, spaced ends of reinforcing plates 52 (FIG. 1) secured to the outer surfaces of the front and rear walls respectively, of the frame, and are also guided, at their lower portions, by brackets 53 (only one of which is shown, FIG. 1) secured to the front and rear walls respectively, of the machine frame.

Each of the plungers 46 and 47 is provided with an outwardly extending pin 54, 55 (FIG. 3) respectively, to which the upper ends of strong coiled tension springs 56, 57 are secured, the lower ends of these springs being attached to adjustable anchor members 58, 59 by means of which the springs may be variably tensioned.

A plate 92 (FIGS. 3 and 4) is shown as underlying the two rods 48 and 49 which connect the plungers 46 and 47, the plate being welded or brazed to the rods 48 and 49 and having elongate slots 93 and 94 which extend longitudinally of the direction of belt movement and which receive pins having screw-threaded engagement with holes in a plate 97 which is thereby connected to the plate 92 but may slide relatively to the latter as permitted by the length of the slots 93 and 94. A coiled spring 98 is connected at one end to the pin 95 and at its other end to a part fixed to the rod 49, the spring thus tending to hold the plate 97 in the position shown in FIG. 4 where the pins 95 and 96 are at the right-hand ends of the slots 93 and 94 respectively. As shown in FIG. 4, the plate 97 is a thick rigid part, desirably of steel or cast iron, having a flat and polished lower surface, and constitutes the hammer whereby the fiber-crushing blow is struck.

A stationary cam device 60 (FIGS. 1 and 2) is mounted on the top member 45 (FIG. 3) of the machine frame, this cam device as here shown (FIG. 3), consisting of a length of stiff sheet material bent to provide transversely spaced, parallel side walls 61 and 62 integrally united to a top member 63. The lower portions of the side walls 61 and 62 are bent horizontally and secured, as by bolts, to the top member 45 of the frame.

As shown in FIGS. 1 and 2, the side walls 61 and 62 of the cam device 60 are of substantially uniform width, upwardly from their lower ends for a distance of approximately ⅔ of the height of the cam device, but then from this point, upwardly, the right-hand edges of the walls of the cam device diverge outwardly and upwardly toward the right to form the inclined cam edges 64 and 65 (FIGS. 1 and 2).

These cam edges cooperate, at times, with a latch device 67 (FIG. 3), here shown as comprising parallel side members 68 and 69 joined at their upper edges by a transversely extending part 70, and having their lower portions fixedly secured to sleeve members 71 and 72, respectively, which may turn on a shaft 73 (FIG. 1) whose opposite ends are fixedly secured to the upper end portions of the plungers 46 and 47. A rigid plate 74, of a width at least equal to the distance between the parts 64 and 65, is fixed at its lower edge to the part 70 of the latch and is provided with a central hole through which freely passes a long pin 70a projecting from a part 70b pivotally attached to one end of a lever device 75, whose other end is pivotally connected to the core 76 of a conventional solenoid 77, the core being guided for horizontal sliding motion.

To the left of the fiber-crushing device H, as viewed in FIGS. 1 and 2, there is arranged a shaft A (FIGS. 1 and 7), turning in bearings in a bracket comprising a front wall 78 (FIG. 1), a rear wall 79 (FIG. 2) and a top wall 80 (FIG. 2), the front and rear walls being fixedly secured to the front and rear walls 42 and 44, respectively, of the machine frame. This shaft extends rearwardly of the wall 79 of the bracket and is provided with a grooved pulley 81 (FIGS. 1 and 2) which receives a belt 82 which is driven by a pulley on the shaft 33 of the drive motor.

On this shaft A, at a point between the walls 78 and 79 of the bearing bracket, there is a crank having a pin X (FIG. 2) which is received in a block which slides in an elongate slot 84 in one arm 85 of a rocker which rocks about a pivot shaft 86 whose opposite ends are fixed in brackets 87 and 88 respectively, projecting upwardly from the front and rear walls 42 and 44 of the frame. This rocker also has an arm 89 (FIGS. 1, 2, 5 and 6) having a substantially rectilinear uper surface 90 which intersects the end surface of said latter arm at an acute angle, the point of intersection of the surface 90 and the end surface moving up and down, as the rocker is rocked, in an arc.

The top member 70 of the latch device, previously described, is at such a distance above the pivotal axis of the shaft 73 on which it rocks that when the arm 89 of the rocker 85 has been rocked downwardly to its lowest position, the member 70 of the latch may be swung rearwardly (FIG. 5) so as to overlie the edge surface 90 of the rocker arm 89. The parts are so arranged that, if when the arm 89 is in said lowermost position the solenoid 77 (FIG. 1) is energized, the lever 75 will rock the latch member to the left (FIG. 1) so that the part 70 of the latch overlies the upper edge 90 of the arm 89 (FIG. 5). As the arm 89 rises, the latch is raised, carrying with it the shaft 73 and the plungers 46 and 47 and thus raising the hammer 97 and stressing the springs 56 and 57. The rotation of the crankpin X is so timed, relatively to the rotation of the toothed feed roll 39 and the travel of the belt run 32, that a cutlet, presented to the feed roll, will be advanced by the latter and by the belts so as to approach the fiber-crushing device H approximately as the hammer 97 begins to rise. A detector device Y (FIGS. 2 and 9) of any suitable type is so arranged relatively to the path of advance of a cutlet as to respond to a passing cutlet and thereby close a switch S in the circuit of the solenoid 77 (FIGS. 1 and 2) thereby energizing the solenoid to draw its core inwardly and so moving the lever 75 as to push the plate 74 and thus move the part 70 into the path of the upwardly moving arm 89. There is a time-delay device Q (FIG. 9) in the circuit of the solenoid 77 so that when the latch member 67 is swung in the counterclockwise direction by the lever member 75, it is held in this rearward position long enough to permit the hammer to strike the cutlet several blows before the solenoid is de-energized. When the arm 89 engages the undersurface of the member 70, it lifts the latter thus raising the hammer.

The continued rise of the arm 89 will engage the plate 74 of the latch device with the cam edges 64 and 65 of the cam device 60 and these cam edges will push the plate 74 of the latch device to the right until the latch device escapes from the end of the arm 89. During the first rise of the hammer 97 and before the member 70 is released from the arm 89, the cutlet will have had sufficient time to arrive at a position directly below the hammer. As the member 70 escapes from the arm 89, the springs 56 and 57 pull the plungers 46 and 47 downward very suddenly. The hammer 97 thus delivers a heavy blow to the belt run 32 immediately above the location of the cutlet and since the cutlet is resting upon the upper run 26 of the lower belt which, in turn, is supported by the rigid plate 40, the blow thus delivered is sufficient to crush or disintegrate the fibers of the cutlet. This action is repeated so long as the solenoid circuit is closed. At the end of the period determined by the time-delay device, the solenoid circuit is broken and a spring (not shown) returns the solenoid core to its initial position thus freeing the latch device from the lever 75. The cutlet is thus tenderized and at the same time so modified in character that it may readily be reduced to a uniform and predetermined thickness, and will not tend to shrink or shrivel during cooking. It will be noted that while the hammer device 97 is down and in contact with the belt, the hammer 97 may slide relatively to the carrier plate 92 so as to move along with the belt a limited distance while exerting downward pressure on the cutlet and without interrupting the advance of the cutlet.

After having been subjected to the fiber-crushing blows of the hammer device 97, the cutlet advances into the field of action of the flattening and stretching device G. This device comprises a pair of vertically movable, parallel plungers 100 and 101 (FIGS. 1 and 7) whose upper portions are guided in slots in the top member 80 of the bracket, above described, which supports the bearings for the shaft A, and at their lower ends by brackets 102 secured to the outer surfaces of the machine frame walls 42 and 44 respectively. Each of the plungers 100 and 101 is provided between its ends with a widened portion 103 (FIG. 7), having a transversely elongate slot 104. These slots receive eccentrics 125 fixed to the shaft A, the arrangement being such that as the shaft turns, the plungers 100 and 101 are moved simultaneously up and down. A rod 104 extends transversely across from one side wall 42 to the opposite side wall 44 of the machine frame, passing through openings in said walls, and is secured at its opposite ends in holes in the respective plungers 100 and 101 so that the rod 104 moves up and down with the plungers. A rigid, cutlet-squeezing and stretching plate 105 (having a smoothly rounded right-hand edge 106) is provided, adjacent to said edge 106, with upstanding rigid, parallel flange members 107 located, respectively, near the front and rear edges of said plate and having horizontally elongate slots 108 which receive the rod 104.

A transversely extending rod 109 (FIGS. 7 and 8) is welded or brazed to the plate 105 near the left-hand edge of the latter, this rod passing through horizontally elongate slots 110 and 111 in the front and rear plates of the machine frame (or in parts adjustably attached to said walls) and is pivotally attached at its outer ends, respectively, to the lower ends of rigid link members 112 and 113 which extend diagonally up and are pivoted, by pins 114, 115, to the plungers 100 and 101, respectively. Coiled tension springs 115 connect the rods 104 and 109. Desirably, as above suggested, the slots 110 and 111 are formed in vertically adjustable plates (not here shown) secured to the front and rear walls of the frame so that the location of the rod 109 may be vertically adjusted with reference to the belt-supporting plate 40 to permit variation in the thickness of the completed cutlet.

As the shaft A rotates, the eccentrics 125 move the plungers 100 and 101 up and down. When the plungers are at their uppermost positions, the axes of the pivot pins 114 and 115 are at their maximum elevations and, because the links 113 are of invariable length, the rod 109 will be near the right-hand ends of the slots 110, 111 and the lower surface of the plate 105 will be inclined upwardly and to the right. The eccentric 125 is of such eccentricity that when in this position the rounded edge 106 of the plate 105 will be above the level of the upper surface of the cutlet which is approaching while confined between the upper and lower belt runs 32 and 26.

The eccentrics 125, in cooperation with the links 113 and the springs 115, act to rock or tilt the plate 105 so that its edge 106 moves up and down repeatedly as the cutlet advances. Thus, when the plate 105 is rocked so as to elevate the edge 106, the advancing margin of the cutlet enters beneath said edge and when the plate rocks down, this edge portion 106 of the plate depresses the belt run so that it bites down onto a narrow marginal portion of the cutlet (for example, one-half inch in width) and squeezes said part as the plate moves along with the belt and cutlet and, in so doing, tensions the springs 115. The plate then again rocks upwardly to elevate the edge 106 while the springs 115 move the plate, oppositely to the belts, back to its original position. A further fractional portion of the cutlet then advances beneath the edge 106 and the operation is repeated time-after-time thus reducing the cutlet step-by-step to the desired thickness.

Figure 8:
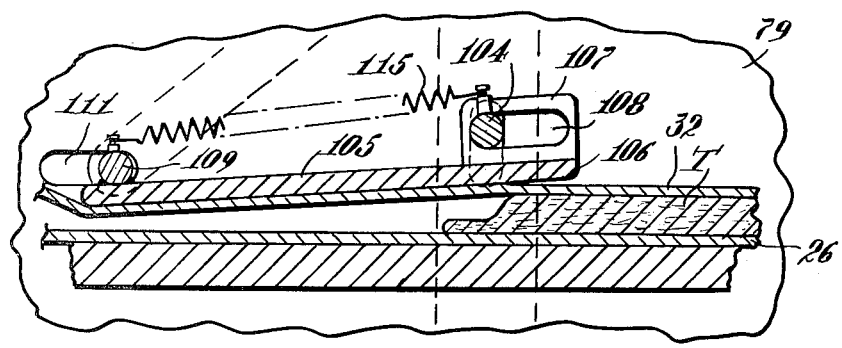
FIG. 8 is a view similar to FIG. 7, but omitting some of the parts and showing the squeezing device in elevation position.

The timing of the parts is such that for each approximately ½ inch advance of the cutlet, the plate 105 will move up and then down. The minimum distance between the belts is at a point immediately below the axis of the pivot rod 109 whose location, vertically, is determined by the slots 110, 111 and this is equal to the final thickness of the cutlet. It may be noted that the run 32 of the upper belt may be somewhat extended because of the movable bearings provided by the shaft A and thus, as shown in FIG. 7, this belt run 32 may be locally depressed by the action of the downcoming plate 105 so that this belt run, by frictional contact with the lower surface of the plate 105, may impart a stretching action on the cutlet so that not only is the cutlet reduced to a desired minimum thickness, but, at the same time, it is stretched in area. In this manner, the cutlet is reduced in thickness in such a way that the material of the cutlet tends to flow or expand outwardly, instead of being densified or compressed as would be the effect were the entire area of the cutlet to be subjected to downward pressure sufficient to reduce the cutlet to the desired thickness in a single step. By this step-by-step reduction in thickness, very little of the juices of the meat are expressed, so that after reduction in thickness the meat retains its natural flavor.

After passing from beneath the plate 105 the cutlet is carried along by the belt run 26 to the exposed area D where it may be removed manually from the belt or picked up by appropriate automatic means or delivered to another conveyor.

While one desirable embodiment of the invention has herein been described by way of example, it is to be understood that the invention is broadly inclusive of all such equivalents or modifications as fall within the terms of the appended claims.

We claim:

1. Apparatus for preparing meat cutlets comprising means for advancing a cutlet uninterruptedly along a predetermined path, and means operative to subject the cutlet to a fiber-crushing blow as it moves along said path, said last-named means comprising a hammer, means mounting said hammer so that, after delivering the blow, said hammer moves along said path at the same linear velocity as the cutlet.

2. Apparatus for preparing meat cutlets comprising a flexable support which moves uninterruptedly along a predetermined path, means for delivering a cutlet to said support, and means operative to subject the cutlet to a fiber-crushing blow as it is moving along with said support, said last-named means comprising a flexible covering element which overlies and moves along with the cutlet, and a rigid hammer which subjects the covering element to a blow for crushing the fiber of the cutlet, said hammer moving along with the covering element as the blow is struck, characterized in having means for raising the hammer, spring means operative to oppose elevation of the hammer, latch means operative temporarily to hold the hammer in elevated position in oppositon to the spring, and means responsive to the advance of a cutlet to release the latch thereby permitting the spring means to impel the hammer downwardly so as to deliver a sudden blow.

3. Apparatus for preparing meat cutlets comprising a flexible carrier which moves uninterruptedly along a predetermined path, a rigid supporting plate having a smooth surface along which said carrier travels, a cylindrical feed roll whose axis is parallel to said surface of the plate and which has peripherally spaced, longitudinally extending teeth, the roll being so located, relatively to the plate, that the lowermost of its teeth is spaced from the flexible carrier a distance less than the initial thickness of the cutlet, and means for turning the roll at a linear velocity substantially equal to that of the flexible carrier and in a direction such as to urge the cutlet in the direction of movement of the carrier, and a fiber-crushing hammer, characterized in having means for raising the hammer, spring means operative to oppose elevation of the hammer, latch means operative temporarily to hold the hammer in elevated position in opposition to the spring, and means responsive to the advance of a cutlet to release the latch thereby permitting the spring means to impel the hammer downwardly so as to deliver a sudden blow.

4. Apparatus for preparing meat cutlets comprising endless, flexible belts having spaced, substantially horizontal runs, one directly above the other, means for delivering a cutlet into the space between said runs of the belts, a hammer for imparting a sudden downward blow to the upper belt run such as to crush the fibers of a cutlet disposed between the belt runs at the point at which the blow is delivered, and means for moving both of said belt runs in the same direction and at the same speed, characterized in having means for raising the hammer, spring means operative to oppose elevation of the hammer, latch means operative temporarily to hold the hammer in elevated position in opposition to the spring, and means responsive to the advance of a cutlet to release the latch thereby permitting the spring means to impel the hammer downwardly so as to deliver a sudden blow.

5. Apparatus according to claim 4, wherein the means for delivering a cutlet to the space between said belt runs comprises a toothed roll arranged above the lower of said parallel belt runs and with its periphery spaced above the latter belt run at a distance less than the initial thickness of the cutlet, means for turning the roll in a direction to advance a cutlet into the space between the belt runs, and means providing a fixed support having a smooth rigid surface for said lower belt run at a point immediately below said roll.

6. Apparatus according to claim 5, further characterized in having two pairs of horizontally spaced supporting rolls, one pair for each respective belt, the rolls which support the lower belt being spaced further apart than those which support the upper belt whereby portions of the upper run of the lower belt are exposed at each end of the apparatus so that a cutlet, to be processed, may be placed upon the exposed upper run of the lower belt for engagement by the toothed roll and may be removed from the exposed portion of the upper run of the lower belt after having been reduced to its final thickness.

7. Apparatus according to claim 4, wherein the means for imparting the fiber-crushing blow to the upper belt run comprises a rigid hammer having a substantially flat underface for contact with the upper surface of said belt run and of an area exceeding that of the cutlet, and means whereby said hammer may move with the belt while in contact with the latter.

8. Apparatus according to claim 1, further characterized in that the means for subjecting the cutlet to a fiber-crushing blow comprises a rigid hammer-carrying frame and means for guiding the frame for vertical movement, means for lifting the frame and for imparting a sudden downward motion thereto, and means for so connecting the hammer to the frame as to permit the hammer to move horizontally, relative to the frame.

9. Apparatus according to claim 1, further characterized in having a vertically movable hammer-carrying frame, spring means which opposes upward motion of the frame, a power-driven, vertically movable rocker arm, means for transmitting upward movement of the rocker arm to the frame comprising a latch device carried by the frame, and means responsive to the advance of a cutlet in approaching the field of action of the hammer to engage said latch device with the rocker arm thereby to lift the frame, and means operative automatically to disengage the frame from the rocker arm when the cutlet is immediately below the hammer.

10. Apparatus according to claim 9, further characterized in having a solenoid comprising a movable core, means for transmitting motion from the solenoid core to the latch thereby to dispose the latter in the path of the upwardly moving rocker arm, and a detector, responsive to each advancing cutlet, one after another, to close a circuit for energizing the solenoid.

11. Apparatus according to claim 10, wherein the solenoid circuit comprises a time-delay device operative to keep the circuit closed until that cutlet, which activated the detector, is directly below the hammer, and cam means operative to disengage the latch from the rocker thereby to permit the spring means to impel the hammer downwardly.

12. Apparatus according to claim 1, further characterized in having means operative, without interruption of the advance of the cutlet, to reduce the cutlet to a predetermined uniform thickness subsequently to its exposure to the fiber-crushing blow.

13. Apparatus according to claim 12, further characterized in that the means for reducing the cutlet to a uniform thickness comprises a rigid plate, said plate having a rounded edge, actuating means for tilting the plate upwardly to permit the marginal portion of the cutlet to advance until it is below said rounded edge of the plate and for rocking the plate downwardly thereby to cause said rounded edge of the plate to force the belt run to bite down into the cutlet and reduce said marginal portion to the desired thickness, the actuating means being operative to tilt the plate up and down repeatedly as the cutlet advances thereby to reduce the thickness of the cutlet step-by-step.

14. Apparatus according to claim 12, wherein the means for reducing the thickness of the cutlet comprises a part operative to apply localized pressure to successive fractional areas of the cutlet as the latter advances.

15. Apparatus according to claim 12, wherein the means for reducing the cutlet to uniform thickness comprises a part operative to apply downward squeezing pressure to a fractional portion of the area of the advancing cutlet, and means for supporting said part to move with the cutlet while applying pressure thereto.

16. Apparatus according to claim 15, further characterized in having means operative to cause said pressure-applying part to bite down onto the advancing cutlet repeatedly as the cutlet advances, each successive bite being nearer to the trailing edge of the cutlet than the preceding bite.

17. Apparatus according to claim 15, further characterized in having means whereby said pressure-applying part first engages a narrow area of the advancing cutlet and squeezes down said area of the cutlet to a predetermined thickness and, as the cutlet advances, progressively engages and squeezes further similar areas until the entire cutlet has been reduced to the desired thickness.

18. Apparatus according to claim 15, further characterized in having means operative to cause said pressure-applying part to bite down upon successive fractional areas of the advancing cutlet so as to reduce the cutlet progressively from its advanced edge toward its opposite edge.

19. Apparatus according to claim 4, comprising, in combinaton, means for reducing the cutlet to a uniform thickness including two vertically movable plungers arranged adjacent to opposite edges respectively, of the upper belt run and each having a transverse pivot pin projecting therefrom, a rigid rod having its opposite ends connected to the respective plungers at points spaced above said pivot pins, a cutlet-stretching plate having a flat undersurface and having upstanding, horizontally slotted flanges near one end, the slots in said flanges receiving the rod which connects the plungers, a horizontal pivot shaft fixed to the opposite edge of said plate, tension springs connecting said pivot shaft to the rod which connects the plungers, rigid links pivotally connected at their upper ends to the pivot pins projecting from the respective plungers, said links extending diagonally downward from said pivot pins and having holes at their lower ends which receive the pivot rod which is fixed to the plate, normally fixed members having elongate horizontal slots for the reception of the opposite ends, respectively, of said pivot rod, the parts being so designed that, as the plungers move downwardly from elevated position, that edge of the plate which is directed toward the advancing cutlet contacts the upper belt run, the diagonal links acting, as the plungers continue to move downwardly, to move the cutlet-stretching plate bodily, longitudinally of the upper belt run in opposition to the action of the tension springs while rocking the plate downwardly about the pivot rod as an axis thereby causing its free edge to press the upper belt run downwardly toward the lower belt run and thus to bite into the advancing marginal edge portion of a cutlet which has been entered beneath the downwardly moving plate, thereby stretching the cutlet while reducing it to uniform thickness.

References Cited by the Examiner

UNITED STATES PATENTS

| | | | |
|---|---|---|---|
| 298,864 | 5/1884 | Lair | 100—154 X |
| 772,964 | 10/1904 | Sackett | 17—25 |
| 1,519,742 | 12/1924 | Tamberlin | 100—222 X |
| 2,205,133 | 6/1940 | Bragg | 17—25 |
| 2,319,213 | 5/1943 | Davies | 100—154 |

SAMUEL KOREN, *Primary Examiner.*

LUCIE H. LAUDENSLAGER, *Examiner.*